Figure 1:
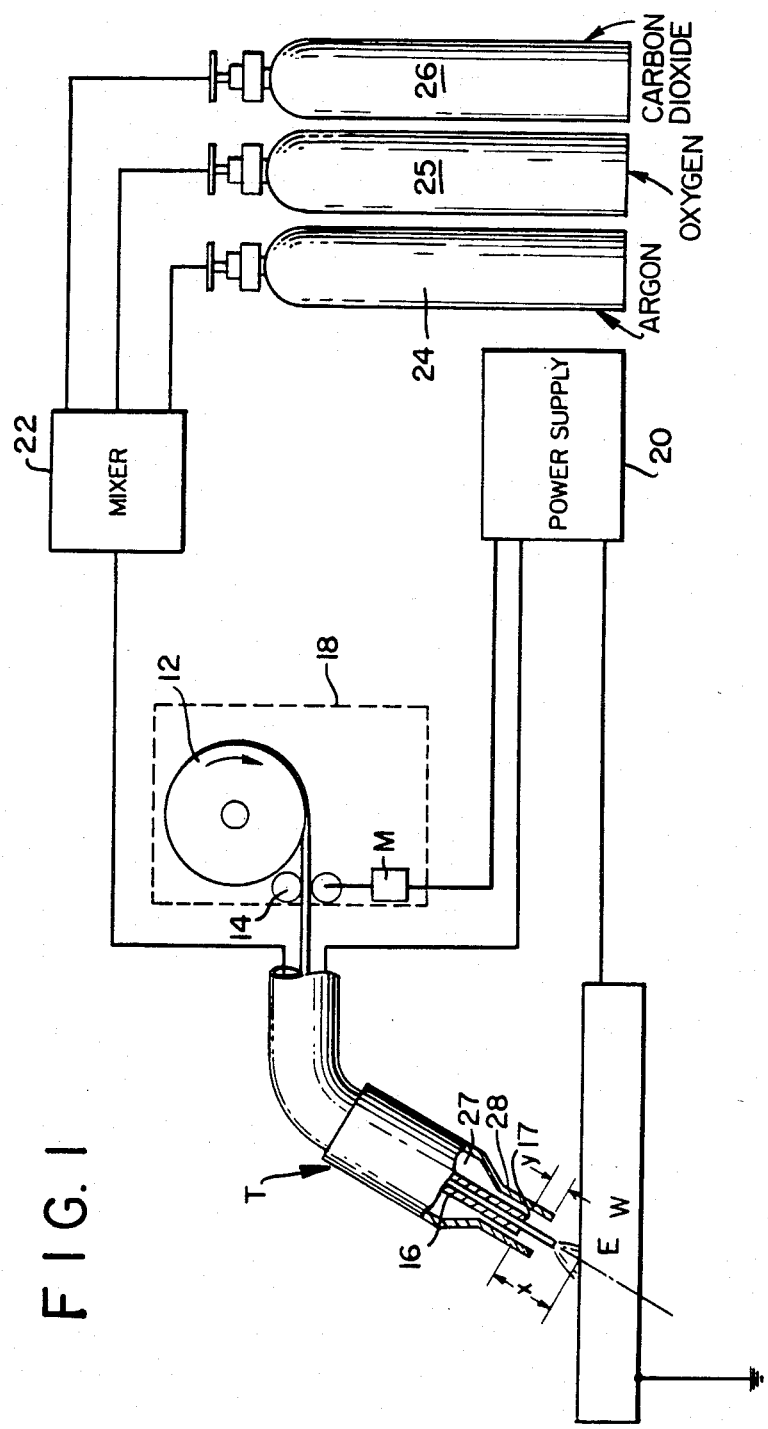

United States Patent [19]

De Vito et al.

[11] Patent Number: 4,645,903
[45] Date of Patent: Feb. 24, 1987

[54] GAS METAL ARC WELDING PROCESS

[75] Inventors: Joseph De Vito, Ashtabula; Kevin A. Lyttle, Mentor; Ronald D. Sutton, Ashtabula; Alan J. Westendorf, Shaker Heights, all of Ohio; Nils E. Larson; Gerald D. Uttrachi, both of Ridgefield, Conn.

[73] Assignee: Union Carbide Corporation, Danbury, Conn.

[21] Appl. No.: 627,833

[22] Filed: Jul. 5, 1984

[51] Int. Cl.$^4$ .................... B23K 9/16; B23K 35/38
[52] U.S. Cl. .................... 219/137 R; 219/74
[58] Field of Search ................ 219/74, 137 R

[56] References Cited

U.S. PATENT DOCUMENTS

| 3,035,154 | 5/1962 | Wolff et al. | 219/74 |
| 3,526,740 | 9/1970 | Brinkmann et al. | 219/74 |
| 3,527,916 | 9/1970 | Ebert et al. | 219/74 |
| 4,403,136 | 9/1983 | Colman | 219/74 X |
| 4,463,243 | 7/1984 | Church | 219/74 |
| 4,529,863 | 7/1985 | Lebel | 219/74 X |

FOREIGN PATENT DOCUMENTS 448106  4/1975  U.S.S.R. .................... 219/74

OTHER PUBLICATIONS

Cary, Howard B., *Modern Welding Technology*, 1979, p. 174.
K. A. Lyttle, GMAW—A Versatile Process on the Move Paper presented to the AWS Annual Meeting, Apr. 5-10, 1981, published in Welding Journal, Mar. 1983, issue vol. 62.

Primary Examiner—Harold Broome
Assistant Examiner—C. M. Sigda
Attorney, Agent, or Firm—E. Lieberstein; Stanley Ktorides

[57] ABSTRACT

The gas metal arc welding process of the present invention extends the axial spray metal transfer range with a non rotating arc from 10 to 25 lbs/hr using an electrode wire diameter between 0.035 to 0.052 inches. The process is carried out by maintaining an electrode extension of between $\frac{3}{4}$ to $1\frac{1}{4}$ inches with a three component shielding gas mixture consisting essentially of argon and oxygen in combination with carbon dioxide or carbon monoxide in a volume proportion of oxygen 1-2% carbon dioxide 8-15%, balance argon. The arc voltage is maintained in a range of between 29 and 40 volts.

4 Claims, 3 Drawing Figures

GAS METAL ARC WELDING PROCESS

This invention relates to gas metal arc welding with a consumable wire electrode at high deposition rates and more particularly to an improved process for gas metal arc welding in the axial spray metal transfer mode over an extended deposition range.

BACKGROUND

Gas metal arc welding, commonly referred to as "GMAW" or "MIG" welding is an arc welding process in which the arc is shielded by a gas from the ambient atmosphere with metal transferred to the workpiece through the arc from a consumable wire electrode. The consumable wire electrode is continuously fed into the arc at a preselected speed corresponding to a given deposition rate for a given wire size. The mode of metal transfer is dependent upon the operating parameters such as welding current, voltage, wire size, wire speed, electrode extension and the protective gas shielding composition. The known modes of metal transfer include short circuit, globular transfer, axial spray transfer, pulse spray transfer and rotating arc spray transfer. The short circuit, globular and pulse spray modes of metal transfer are low deposition rate processes in which metal is deposited at rates below about 7 lbs/hr. The rotating arc axial spray mode of metal transfer is a very high deposition rate process which is unstable at metal deposition rates below about 20 lbs/hr using electrode wire size diameters of 0.035 inches or larger. Below this minimum rate of metal deposition the rotating arc becomes erratic and/or is unsustainable. The axial spray mode of metal transfer is used for depositing metal at rates above the low deposition rates provided by the short circuit, globular transfer or pulse spray modes of metal transfer and below the very high deposition rates obtained in the rotating arc axial spray mode. However, conventional practice of gas metal arc welding in the axial spray mode of metal transfer is limited to a rate of metal deposition between about 5-12 lbs/hr using a wire diameter size range of between 0.035 to 0.052 inches. Above this deposition range the welding operation becomes erratic and unstable until a rotating arc is established by raising the wire feed rate to the minimum deposition rate required for a stable rotating arc.

The non-rotating arc axial spray mode of metal transfer is considered to be the preferred choice of metal transfer for all position GMAW welding where reliability, stability, high quality and at least a relatively high deposition rate is required. In the axial spray mode of metal transfer fine droplets of molten metal are pinched off the end of the moving wire and fed axially through the arc column to the weld pool. The pinch effect is caused by electromagnetic forces on the molten tip of the wire. In the conventional practice of axial spray transfer, metal transfer remains stable only up to a deposition rate of about 12 lbs/hr. The rotating spray arc was developed to increase the operating deposition range for GMAW welding. In the rotating arc mode of metal transfer the arc is physically rotated by electromagnetic forces in a helical pattern about a longitudinal axis. As the arc rotates a controlled stream of metal droplets are transferred from the electrode tip to the weld pool over a relatively wide area. The pattern of penetration into the workpiece provided by the non-rotating arc axial spray transfer mode is much deeper than is obtained in the rotating arc mode and is easier to control.

SUMMARY

It has been discovered in accordance with the present invention that the non-rotating arc axial spray mode of metal transfer may be extended substantially beyond conventional practice and up to about 25 lbs/hr with an electrode wire diameter between 0.035 and 0.052 inches without losing arc stability through the judicious selection and fine tuning of certain operating parameters which in combination have been found to be critical. These parameters include the protective gas shielding mixture, the electrode extension and the operating arc voltage. Accordingly, the gas metal arc welding process of the present invention comprises the steps of:

forming an arc between a consumable wire electrode, having a diameter between 0.035 and 0.052 inches, and a workpiece;

maintaining a substantially constant arc voltage between the consumable wire electrode and the workpiece in a range of between 29 and 40 volts;

feeding the consumable wire electrode, through a welding torch contact tube, into the arc and at a metal deposition rate of between about 10 to 25 lbs/hr, with metal being transferred from the electrode to the workpiece in fine droplet form without arc rotation;

maintaining the welding torch contact tube at a predetermined height above the workpiece to establish an electrode extension of between $\frac{3}{4}$ to $1\frac{1}{2}$ inches; and shielding the arc with a protective gas mixture consisting essentially of argon and oxygen in combination with carbon dioxide or carbon monoxide in the following proportion by volume:

oxygen: 1-2%
carbon dioxide or carbon monoxide: 8-15%
balance argon.

OBJECTS

It is the principal object of the present invention to provide a method for gas metal arc welding in the spray arc metal transfer mode without arc rotation and at high deposition rates of between 12 and 25 lbs/hr using a consumable wire electrode having a diameter between 0.035 and 0.052 inches.

Figure 2:
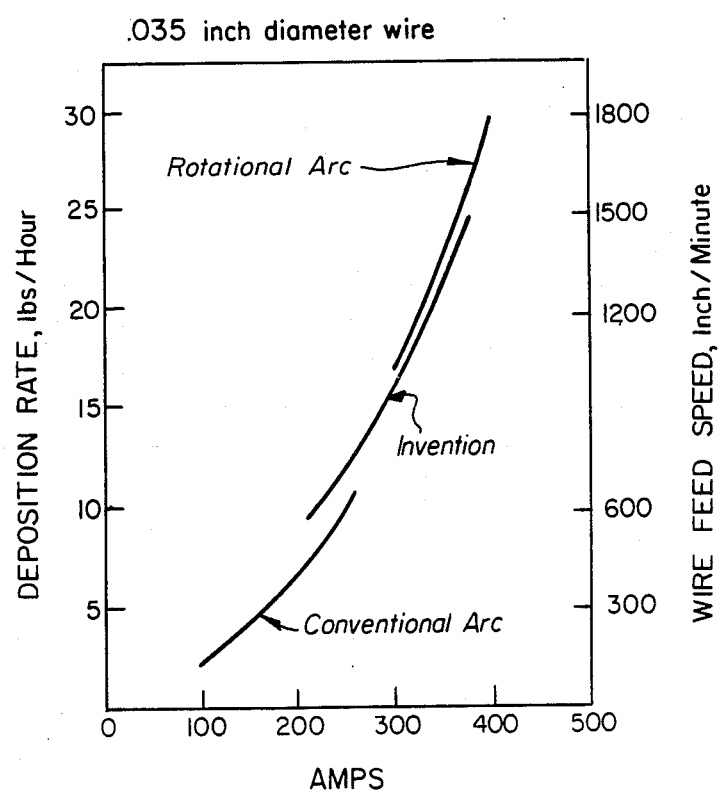
Figure 3:
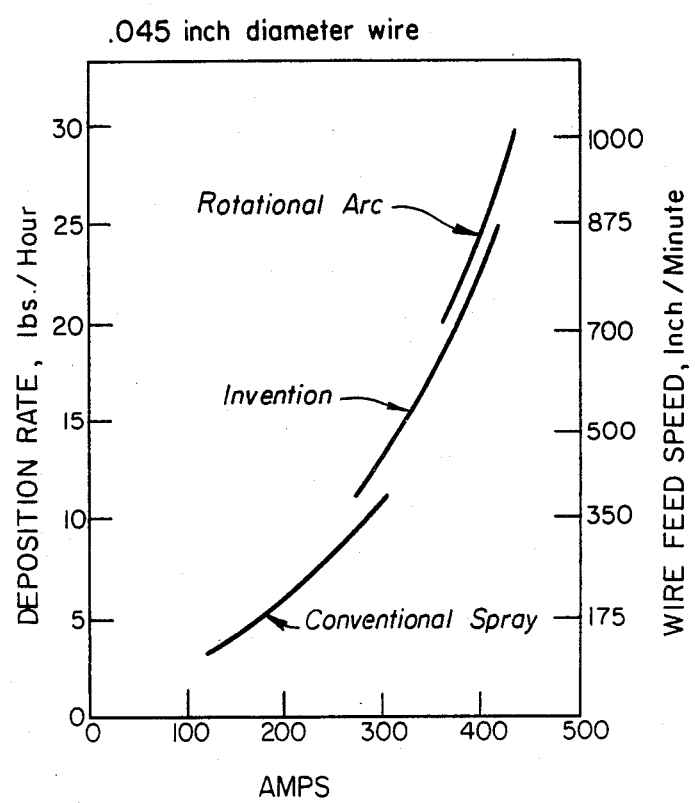

Other objects and advantages of the present invention will become apparent from the following detailed description of the invention when read in conjunction with the accompanying drawings of which:

FIG. 1 is a schematic diagram of a typical apparatus set up for carrying out the process of the invention;

FIG. 2 is a graph illustrating the range of performance for the process of the present invention in comparison to the conventional practice for GMAW welding in the axial spray and rotating arc metal transfer modes of operation using a 0.035 inch diameter consumable wire electrode; and FIG. 3 is a graph similar to FIG. 2 illustrating the range of performance using a 0.045 inch diameter consumable wire electrode.

FIG. 1 illustrates a typical welding set up for performing a gas metal arc welding operation. A consumable wire electrode E, composed of any desired metal composition appropriate for the particular welding application, is drawn from a reel 12 by a feed roll 14 through a contact tube 16 in a conventional shielded arc working torch T. A suitable shielded arc torch for use in this process is the ST-16 torch of the Union Carbide Corporation. The torch T may be either manually operated or mechanized. The feed roll 14 is driven by a drive motor M contained in a conventional wire feeding unit 18 capable of feeding wire at the speeds necessary to achieve the desired deposition rates. Union Carbide "Hi-Dep" feeders capable of feeding wire up to 2000 ipm can be used. To assist in handling the inertia of a rotating wire package, it is desirable to employ a coasting breaking system with a adaptive burnback circuit to prevent the wire from sticking to the contact tube upon termination of the welding operation.

The power supply 20 supplies power to both the wire feeding unit 18 and the torch T. The power supply 20 is voltage controlled and of the constant potential type or current controlled and of the conventional type. A constant potential type power supply is preferred. In either case the voltage across the arc formed between the electrode and workpiece should be maintained substantially constant. The constant current type power supply system is a more complex system using arc voltage feedback to monitor the arc voltage and hold it relatively constant by modulating the wire feed speed. This is unnecessary with a constant potential type power supply. In accordance with the process of the present invention the arc voltage is set at a point where a stable arc is achieved with minimal spatter. Using a constant potential type power supply a stable arc is achieved with an arc voltage between 29 to 40 volts.

An arc is established between the consumable electrode E and the workpiece W by energizing the power supply 20 and feeding the electrode into direct contact with the workpiece. Shielding gas is fed from a source of supply containing a tri-mixture of argon, oxygen and carbon dioxide in the critical proportion as earlier identified or by using a conventional gas mixer 22 into which argon, oxygen and carbon dioxide are fed from independent gas tanks 24, 25 and 26 respectively. The gas mixer 22 must be set to establish the gas tri-mixture in the critical proportion containing at least 8 to 15% $CO_2$ or CO or a mixture thereof, 1-2% oxygen and the balance argon. The mixed shielding gas composition is critical to the process of the present invention. The use of carbon dioxide in the gas mixture is preferred over the use of carbon monoxide. The mixed shielding gas is fed into the torch T in a conventional manner to pass through the space 27 between the torch contact tube 16 and the torch cap 28 so that it forms a shroud for shielding the arc from ambient atmosphere. The torch cap 28 should preferably extend beyond the front end 17 of the contact tube 16, i.e., the contact tube is recessed within the torch cap a distance "y" equal to at least 3/16 inch.

It is not clearly understood why the shielding gas mixture is so critical to the high deposition rate achieved with the practice of the present invention. However, divergence from this critical mixture results in an unstable arc at the desired higher deposition rates when in the axial spray mode of metal transfer without arc rotation. Although it is possible that the higher deposition rates of the present invention may be achieved using yet other non-conventional shielding gas mixtures the performance of the present invention is limited to the specific gas constituents of oxygen, argon and either $CO_2$ or CO in combination and in the proportions specified above. It should be further pointed out that the gas composition of the present invention is limited to argon and other inert components may not be used in place thereof.

The electrode E is fed through the contact tube 16 into the arc formed between the electrode E and workpiece W. The contact tube 16 is connected through the torch T to the power supply 20 for supplying power to the electrode E. The workpiece W is connected to ground in common with the power supply ground. In accordance with the practice of the present invention the torch T should be held above the workpiece W to assure a predetermined electrode extension or torch to work distance "x" of between $\frac{3}{4}$ to $1\frac{1}{2}$ inches with one inch being the preferred distance.

The ability to achieve high deposition rates using a wire diameter between 0.035 to 0.052 inches previously required operating in the rotational spray arc region with commensurate very high deposition rates. As shown in FIGS. 2 and 3 the rotational spray arc has a minimum operating deposition rate of about 17 lbs/hr with 0.035 inch diameter wire and 20 lbs/hr with 0.045 inch diameter wire. On the other hand the conventional spray arc is erratic at deposition rates above about 12 lbs/hr as FIGS. 2 and 3 indicate. Stated otherwise it was not possible to perform a stable GMAW operation at a deposition rate between about 12 to 18 lbs/hr using a solid wire electrode with a diameter between 0.035 to 0.052 inches. Using the tri-gas mixture of argon, oxygen and carbon dioxide or carbon monoxide in combination and within the ranges indicates heretofore with an electrode extension "x" between $\frac{3}{4}$ and $1\frac{1}{2}$ inches and a working arc voltage range of between 29 and 40 volts extends the GMAW welding deposition range from about 10 lbs/hr up to 25 lbs/hr without the use of a rotating arc. The corresponding wire feed speeds are shown in FIGS. 2 and 3. The electrode extension x should be selected to correspond to the working electrode diameter in the following relationship:

| Electrode Diameter | Electrode Extension |
|---|---|
| .035 to .045 in. | $\frac{3}{4}$ to $1\frac{1}{4}$ inches |
| .045 to .052 in. | $\frac{7}{8}$ to $1\frac{1}{2}$ inches |

The apparatus used in practicing the process of the present invention, although primarily intended for welding in the axial spray transfer mode, may also be used for low deposition rate welding in the short circuit transfer mode using the shielding gas mixture of the present invention. Accordingly, the apparatus and shielding gas mixture of the present invention is not limited to axial spray transfer GMAW welding but is instead universal to all modes of metal transfer in a GMAW operation.

We claim:

1. A gas metal arc welding process in which an arc is formed between a consumable wire electrode and a workpiece comprising the steps of:
    (a) maintaining a constant potential between said consumable wire electrode and said workpiece in a range of between 29 and 40 volts;
    (b) feeding said consumable wire electrode through a welding torch contact tip toward said workpiece to establish a metal deposition rate of between 10 and 25 lbs./hr. with the metal transfer occurring axially through the arc in a fine droplet form;
    (c) maintaining the welding torch contact tip at a predetermined height above the workpiece so as to provide an electrode extension of between $\frac{7}{8}$-$1\frac{1}{8}$ inches; and (d) shielding the arc with a protective gas mixture consisting of argon, oxygen and carbon dioxide in the following proportion by volume:
oxygen: 1-2%
carbon dioxide: 8-15%
balance argon.

2. A process as defined in claim 1 wherein said arc voltage is maintained at a constant level of between 29 to 40 volts.

3. A process as defined in claim 2 wherein said contact tube is recessed in a welding torch with said welding torch having a gas cup extending beyond the front end of the contact tube.

4. A gas metal arc welding process in which an arc is formed between a consumable wire electrode and said workpiece comprising the steps of:

(a) maintaining a constant potential between said consumable wire electrode and said workpiece in a range of 29 an 40 volts;
(b) feeding said consumable wire electrode through welding torch contact tip toward said workpiece to establish a metal deposition rate of between 10 and 25 lbs./hr. with the metal transfer occurring axially through the arc in a fine droplet form;
(c) maintaining the welding torch contact tip at a predetermined height above the workpiece so as to provide an electrode extension of between $\frac{7}{8}$-$1\frac{1}{8}$ inches; and
(d) shielding the arc with a protective gas mixture consisting of argon, oxygen and carbon monoxide in the following proportion by volume:
oxygen: 1-2%
carbon monoxide: 8-15%
balance argon.

* * * * *